United States Patent
Wang et al.

(10) Patent No.: US 10,087,264 B2
(45) Date of Patent: Oct. 2, 2018

(54) MAGNESIUM HALIDE SOLUTION, PREPARING METHOD AND USE THEREOF

(71) Applicants: China Petroleum & Chemical Corporation, Beijing (CN); Beijing Research Institute Of Chemical Industry, China Petroleum & Chemical Corporation, Beijing (CN)

(72) Inventors: Shibo Wang, Beijing (CN); Junling Zhou, Beijing (CN); Dongbing Liu, Beijing (CN); Lei Zhang, Beijing (CN); Xinping Lv, Beijing (CN); Bingquan Mao, Beijing (CN); Zhenjie Liu, Beijing (CN); Xin Zhou, Beijing (CN); Changli Zhang, Beijing (CN); Baoquan Xing, Beijing (CN)

(73) Assignees: China Petroleum & Chemical Corporation, Beijing (CN); Beijing Research Institute of Chemical Industry, China Petroleum & Chemical Corporation, Beijing (CN)

( * ) Notice: Subject to any disclaimer, the term of this patent is extended or adjusted under 35 U.S.C. 154(b) by 0 days.

(21) Appl. No.: 15/307,216

(22) PCT Filed: Apr. 29, 2015

(86) PCT No.: PCT/CN2015/077801
§ 371 (c)(1),
(2) Date: Oct. 27, 2016

(87) PCT Pub. No.: WO2015/165402
PCT Pub. Date: Nov. 5, 2015

(65) Prior Publication Data
US 2017/0058060 A1 Mar. 2, 2017

(30) Foreign Application Priority Data

Apr. 29, 2014 (CN) .......................... 2014 1 0176117
Apr. 29, 2014 (CN) .......................... 2014 1 0176196
Apr. 29, 2014 (CN) .......................... 2014 1 0180571

(51) Int. Cl.
*C08F 110/02* (2006.01)
*C08F 4/649* (2006.01)
*C08F 10/02* (2006.01)
*C08F 10/06* (2006.01)

(52) U.S. Cl.
CPC ............ *C08F 110/02* (2013.01); *C08F 4/649* (2013.01); *C08F 10/02* (2013.01); *C08F 10/06* (2013.01)

(58) Field of Classification Search
None
See application file for complete search history.

(56) References Cited

U.S. PATENT DOCUMENTS

2011/0046325 A1* 2/2011 Zhang .................... C08F 10/02
526/123.1

FOREIGN PATENT DOCUMENTS

| CN | 1167119 A | 12/1997 |
|---|---|---|
| CN | 101560273 A | 10/2009 |
| CN | 101798362 A | 8/2010 |
| CN | 102050893 A | 5/2011 |
| CN | 102268110 A | 12/2011 |
| CN | 102850385 A | 1/2013 |
| CN | 102850386 A | 1/2013 |
| CN | 103044583 A | 4/2013 |

OTHER PUBLICATIONS

International Search Report from the State Intellectual Property Office of the P.R. China for International Application No. PCT/CN2015/077801 dated Aug. 5, 2015.

* cited by examiner

*Primary Examiner* — Catherine S Branch
(74) *Attorney, Agent, or Firm* — Finnegan, Henderson, Farabow, Garrett & Dunner, LLP

(57) ABSTRACT

A magnesium halide solution is disclosed. The magnesium halide solution comprises a magnesium halide, an oxygen-containing organic titanium compound, a hydroxyl-containing compound, and an organic solvent. The magnesium halide solution further comprises an organic heterocyclic compound. The organic solvent is a hydrocarbon and/or a halogenated hydrocarbon. The organic heterocyclic compound is at least one selected from a group consisting of a sulphur-containing organic heterocyclic compound, a nitrogen-containing organic heterocyclic compound, and an organic epoxy compound. The magnesium halide solution has a good stability, and can be used for preparing a catalyst for olefin polymerization and copolymerization reactions. The raw material of the magnesium halide solution is cheap and easy to be obtained. The preparing method is easy to be performed and is environment-friendly.

26 Claims, No Drawings

MAGNESIUM HALIDE SOLUTION, PREPARING METHOD AND USE THEREOF

CROSS REFERENCE TO RELATED APPLICATION

The present application claims priority of Chinese patent applications CN201410180571.8, CN201410176196.X, and CN201410176117.5 filed on Apr. 29, 2014, the entirety of which is incorporated herein by reference.

FIELD OF THE INVENTION

The present disclosure relates to a magnesium halide solution, a preparing method and a use thereof.

BACKGROUND OF THE INVENTION

With the development of olefin polymerization technology, the research on catalyst that is used in polymerization reaction has made a great progress, among which the high efficiency catalyst holds an important position in polyolefin catalyst field by virtue of its good polymerization performance and mature application techniques. In particular, the production and development of polyolefin resin with new structure is drawing increasingly more attention, and thus the requirement for the overall performance of the catalyst used in olefin polymerization reaction is becoming increasingly high. On the one hand, the catalyst should adapt to the production equipment, and on the other hand, the structure of the resin produced therein can be regulated and controlled. After years of research, it is demonstrated that Mg—Ti series high efficiency catalysts can meet the requirement.

At present, the Mg—Ti series high efficiency catalysts are mainly prepared through a dissolution-precipitation method. That is, a magnesium compound is dissolved in a solvent, and a corresponding catalyst can be obtained after precipitation. For example, Japanese patent 54-40293 discloses that a magnesium compound is dissolved in a titanate compound, Japanese patents 56-811 and 58-83006 disclose that a magnesium compound is dissolved in alcohol, aldehyde, amine, or carboxylic acid compounds, Japanese patent 58-19307 discloses that a magnesium compound is dissolved in an organic phosphorus compound, and Japanese patent 58-183708 discloses that a magnesium compound is dissolved in a mixed solvent of an organic epoxy compound and an organic phosphorus compound (a phosphate ester compound).

The disadvantages of grinding method can be overcome to a certain extent by the aforesaid magnesium compound dissolution method, but there are still a lot of disadvantages in this method. The activity of the catalyst that is precipitated from the magnesium compound solution disclosed by Japanese patent 54-40293, Japanese patent 58-19307, and Japanese patent 58-183708 is relatively low. Besides, the activity of the catalyst drops apparently when the polymerization time is prolonged. Moreover, the bulk density of the polymer obtained therein is relatively low.

As a result, there is still a need for the Mg—Ti series high efficiency catalyst with a good overall performance and a magnesium halide solution used for preparing the catalyst so as to further improve the technical effect of the olefin polymerization reaction.

SUMMARY OF THE INVENTION

It is discovered after repeated experiments that, a proper magnesium halide solution can be used for preparing an Mg—Ti series high efficiency catalyst with a good catalytic performance which can be used in olefin polymerization reaction.

The present disclosure aims to provide a magnesium halide solution. The preparing condition of the magnesium halide solution is mild, and the raw material is cheap and easy to be obtained. The magnesium halide solution can be used for preparing a Mg—Ti series catalyst with a good catalytic performance in olefin polymerization reaction, such as ethylene polymerization reaction.

The present disclosure provides a method for preparing the magnesium halide solution. The preparing condition is mild, and the equipment utilization rate thereof is high. The method is easy to be performed and is environment-friendly.

The present disclosure further provides a use of the aforesaid magnesium halide solution.

The present disclosure provides a magnesium halide solution. The magnesium halide solution comprises a magnesium halide, an oxygen-containing organic titanium compound, a hydroxyl-containing compound, and an organic solvent. The magnesium halide solution further comprises an organic heterocyclic compound. The organic solvent is a hydrocarbon and/or a halogenated hydrocarbon. The magnesium halide solution can be used for preparing a catalyst for olefin polymerization reaction.

According to the present disclosure, a raw material anhydrous magnesium halide is preferably a crystalline magnesium halide, which can have $\alpha$, $\beta$, or $\gamma$ crystal shape. In the magnesium halide solution according to the present disclosure, the magnesium halide is in an amorphous state. That is, according to the present disclosure, the magnesium halide solution does not contain crystalline magnesium halide, which is a prominent advantage of the present disclosure. In general, magnesium halide is difficult to be absolutely dissolved in organic solvent, and at least part of crystalline magnesium halide would be contained in the organic solvent, which would not facilitate the effective utilization thereof. During preparing of catalyst, magnesium halide should be converted into an amorphous state from a crystalline state, whereby the catalyst can have a high activity. It is discovered after long periods of experiments that, the anhydrous magnesium halide in the crystalline state can be dissolved fully in some specific mixed organic solvents so as to form an amorphous magnesium halide solution, which can be used for preparing catalyst for olefin polymerization reaction.

According to some embodiments, the magnesium halide solution is composed of a magnesium halide, an oxygen-containing organic titanium compound, a hydroxyl-containing compound, an organic solvent, and an organic heterocyclic compound. The organic solvent is a hydrocarbon and/or a halogenated hydrocarbon. That is, the magnesium halide solution is composed of magnesium halide and a mixed solvent consisting of four solvents, i.e., the oxygen-containing organic titanium compound, the organic heterocyclic compound, the hydroxyl-containing compound, and the organic solvent.

According to the present disclosure, in addition to the aforesaid five essential ingredients, the magnesium halide solution can further contain other organic solvent. For example, the organic solvent can be selected from a group consisting of ester, ketone, and amine compounds. The use amount of these organic solvents should not affect the liquid phase of the final magnesium halide solution product.

According to one preferred embodiment of the present disclosure, the organic heterocyclic compound is at least one selected from a group consisting of a sulphur-containing organic heterocyclic compound, a nitrogen-containing organic heterocyclic compound, and an organic epoxy compound.

Preferably, the sulphur-containing organic heterocyclic compound is at least one selected from a group consisting of a 3 to 8-membered ring sulphur-containing heterocyclic compound and a sulphur-containing heterocyclic compound that is in parallel connection with a benzene ring to form a condensed ring, preferably at least one selected from a group consisting of thiophene, thiazole, isothiazole, benzothiophene, and 4,6-dimethylbenzothiophene.

Preferably, the nitrogen-containing organic heterocyclic compound is at least one selected from a group consisting of a 3 to 8-membered ring nitrogen-containing heterocyclic compound and a nitrogen-containing heterocyclic compound that is in parallel connection with a benzene ring to form a condensed ring, preferably at least one selected from a group consisting of pyrrole, thiazole, imidazole, pyridine, pyrazine, pyrimidine, pyridazine, indole, quinoline, and pteridine.

According to the present disclosure, the organic epoxy compound can be one selected from a group consisting of aliphatic olefin with 2 to 8 carbon atoms, diolefin, halogenated aliphatic olefin, diolefin oxide, glycidyl ether, and inner ether compound. The organic epoxy compound can be a ternary epoxy compound, 4 to 8-membered epoxy compound, a single epoxy compound or a polyepoxy compound.

The organic epoxy compound is a 3 to 8-membered epoxy compound, preferably a 3-membered epoxy compound as shown in formula (I):

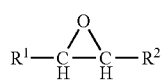

wherein in formula (I), $R^1$ and $R^2$ respectively represent H, or $C_1$ to $C_{10}$ saturated or unsaturated linear, branched, or cyclic hydrocarbyl or $C_1$ to $C_{10}$ saturated or unsaturated linear, branched, or cyclic halogenated hydrocarbyl.

According to the present disclosure, the organic epoxy compound is at least one selected from a group consisting of ethylene oxide, propylene oxide, butylene oxide, butadiene oxide (such as 1,3-butadiene monoepoxide), butadiene double oxide, epichlorohydrin, methyl glycidyl ether (such as trityl glycidyl ether), diglycidyl ether, and tetrahydrofuran.

According to the present disclosure, the magnesium halide solution does not contain an organic phosphorus compound, especially a phosphate ester compound. In this case, when downstream product is prepared with the magnesium halide solution disclosed herein, residual phosphorus would not be contained therein. Therefore, the quality of the downstream product can be improved, and environmental pollution can be avoided. The organic phosphorus compound is a commonly used raw material for preparing catalyst of olefin polymerization reaction. However, when the magnesium halide solution provided herein is used, magnesium halide can be dissolved fully in the organic solvent system without organic phosphorus compound being introduced. The magnesium halide solution can be used for preparing olefin polymerization catalyst with good catalytic performance, and the environmental pollution can be reduced. The phosphate ester compound is tributyl phosphate, tri-isobutyl phosphate, tripropyl phosphate, triethyl phosphate, or trimethyl phosphate.

According to the present disclosure, the magnesium halide solution is formed by dissolving the anhydrous magnesium halide into a mixed solvent that is composed of the oxygen-containing organic titanium compound, the organic heterocyclic compound, the hydroxyl-containing compound, and the organic solvent.

According to one preferred embodiment of the present disclosure, a molar concentration of magnesium halide in the magnesium halide solution ranges from 0.0001 mol/L to 20 mol/L, preferably from 0.001 mol/L to 10 mol/L, more preferably from 0.1 mol/L to 10 mol/L.

According to one preferred embodiment of the present disclosure, measuring by per molar of magnesium halide, the magnesium halide solution contains the oxygen-containing organic titanium compound 0.01 mol to 2.0 mol, preferably 0.1 mol to 1.5 mol, more preferably 0.5 mol to 1.5 mol. Specifically, the magnesium halide solution can contain the oxygen-containing organic titanium compound 0.01 mol, 0.05 mol, 0.10 mol, 0.15 mol, 0.20 mol, 0.30 mol, 0.40 mol, 0.50 mol, 0.60 mol, 0.70 mol, 0.80 mol, 0.90 mol, 1.0 mol, 1.2 mol, 1.4 mol, 1.6 mol, 1.8 mol, or 2.0 mol.

Measuring by per molar of magnesium halide, the magnesium halide solution contains the organic heterocyclic compound 0.01 mol to 10 mol, preferably 0.1 mol to 6.5 mol, more preferably 0.5 mol to 5.0 mol. Specifically, the magnesium halide solution can contain the organic heterocyclic compound 0.01 mol, 0.1 mol, 0.5 mol, 1.0 mol, 1.5 mol, 2.0 mol, 2.5 mol, 3.0 mol, 3.5 mol, 4.0 mol, 4.5 mol, 5.0 mol, 5.5 mol, 6.0 mol, 6.5 mol, 7.0 mol, 7.5 mol, 8.0 mol, 8.5 mol, 9.0 mol, 9.5 mol or 10 mol.

Measuring by per molar of magnesium halide, the magnesium halide solution contains the hydroxyl-containing compound 0.01 mol to 20 mol, preferably 0.1 mol to 15 mol, more preferably 0.5 mol to 10 mol. Specifically, the magnesium halide solution can contain the hydroxyl-containing compound 0.01 mol, 0.1 mol, 0.5 mol, 1.0 mol, 1.5 mol, 2.0 mol, 2.5 mol, 3.0 mol, 3.5 mol, 4.0 mol, 4.5 mol, 5.0 mol, 5.5 mol, 6.0 mol, 6.5 mol, 7.0 mol, 7.5 mol, 8.0 mol, 8.5 mol, 9.0 mol, 9.5 mol, 10 mol, 12 mol, 14 mol, 16 mol, 18 mol or 20 mol.

Through selecting proper solvents and a proper ratio thereamong, the crystalline anhydrous magnesium halide can be fully dissolved in the mixed organic solvent, whereby the utilization rate of magnesium halide can be improved, the using amount of solvent can be reduced, and thus the cost thereof can be saved.

According to the present disclosure, a formula of the magnesium halide is $MgX_2$, X being halogen.

According to the present disclosure, a formula of the oxygen-containing organic titanium compound is $Ti(OR^3)_nX_{4-n}$, $R^3$ representing $C_1$ to $C_{20}$ saturated or unsaturated linear, branched, or cyclic hydrocarbyl, $0<n\le4$, and X being halogen. Here, it can be understood that, X in the formula $MgX_2$ of magnesium halide can be the same as or different from X in the formula $Ti(OR^3)_nX_{4-n}$ of the oxygen-containing organic titanium compound.

According to the present disclosure, a formula of the hydroxyl-containing compound is $HOR^4$, $R^4$ representing $C_1$ to $C_{20}$ saturated or unsaturated linear, branched, or cyclic hydrocarbyl.

According to the present disclosure, the hydrocarbon is $C_3$ to $C_{100}$ saturated or unsaturated linear, branched, or cyclic aliphatic hydrocarbon or aromatic hydrocarbon, preferably $C_4$ to $C_{20}$ hydrocarbon. The halogenated hydrocarbon is $C_3$ to $C_{100}$ saturated or unsaturated linear, branched, or cyclic aliphatic halogenated hydrocarbon or aromatic halogenated hydrocarbon, preferably $C_4$ to $C_{20}$ halogenated hydrocarbon.

Preferably, the magnesium halide is at least one selected from a group consisting of magnesium chloride, magnesium bromide, and magnesium iodide. The oxygen-containing organic titanium compound is a titanate compound, preferably at least one selected from a group consisting of tetraethyl titanate, tetraisopropyl titanate, tetrabutyl titanate, and tetraisooctyl titanate. The hydroxyl-containing compound is at least one selected from a group consisting of aliphatic alcohols, aromatic alcohols, and phenols, preferably at least one selected from a group consisting of methanol, ethanol, isopropanol, n-butanol, n-hexanol, isooctanol, benzyl alcohol, and phenylethyl alcohol. The hydrocarbon is at least one selected from a group consisting of benzene, toluene, xylene, n-butane, isobutene, isopentane, n-pentane, n-hexane, cyclohexane, heptanes, octane, and decane. The halogenated hydrocarbon is selected from 1, 2-dichloroethane and/or chlorobenzene.

The present disclosure provides a method for preparing the aforesaid magnesium halide solution, and the method comprises dissolving an anhydrous magnesium halide into a mixed solvent that is composed of an oxygen-containing organic titanium compound, an organic heterocyclic compound, a hydroxyl-containing compound, and an organic solvent in a uniform manner. The adding order of each solvent is generally not defined.

According to one preferred embodiment of the present disclosure, the method comprises mixing the anhydrous magnesium halide with the oxygen-containing organic titanium compound, the organic heterocyclic compound, and the hydroxyl-containing compound in a uniform manner (a transparent solution can be obtained at this time), and mixing the solution with the organic solvent so as to obtain the magnesium halide solution.

During preparing procedure of amorphous magnesium halide solution, the temperature at which the magnesium compound, the organic heterocyclic compound, the oxygen-containing organic titanium compound, the hydroxyl-containing compound, the hydrocarbon and the halogenated hydrocarbon contact with one another depends on the property of the reactants. The reactants are generally mixed at a relatively high temperature, preferably below the decomposition temperature of the reactants. The temperature is no higher than 200° C., preferably no higher than 150° C. The dissolution time depends on the property of the reactants and the operational condition thereof. The dissolution should proceed for a period of time until a completely transparent solution can be obtained. The time generally ranges from 10 minutes to 24 hours, preferably from 2 hours to 16 hours.

According to one preferred embodiment of the present disclosure, in the aforesaid method, a mixing temperature ranges from 0° C. to 200° C., preferably from 20° C. to 150° C., and a mixing time ranges from 10 minutes to 24 hours, preferably from 2 hours to 16 hours.

After magnesium halide is dissolved, the hydrocarbon and/or the halogenated hydrocarbon as above defined can be added to the solution. The magnesium halide solution can be regulated to a certain concentration, so that it can be preserved for a relatively long period of time.

The present disclosure further provides a use of the aforesaid magnesium halide solution in olefin polymerization reaction. For example, the magnesium halide solution can be used for preparing a catalyst for olefin polymerization reaction.

According to the present disclosure, the raw material of the magnesium halide solution is cheap and can be obtained easily. The magnesium halide solution can be used for preparing Mg—Ti series catalyst with a good catalytic performance in olefin polymerization reaction, for example, ethylene polymerization reaction. The preparing method of the magnesium halide solution disclosed herein has the advantages of convenient operation, mild using condition, a high equipment utilization rate, and environment-friendly.

DETAILED DESCRIPTION OF THE EMBODIMENTS

The present disclosure will be illustrated in detail hereinafter with reference to specific examples. It can be understood that, the examples disclosed herein are not used for restricting the present disclosure.

EXAMPLE 1

An amorphous magnesium halide solution was prepared: anhydrous magnesium chloride (4.75 g) was added into a mixed solvent composed of tetrabutyl titanate (17.6 mL), thiophene (4.0 mL), anhydrous ethanol (5.6 mL), and toluene (200 mL), and the mixed solution was maintained at 60° C. and stirred for 8 hours so as to form a transparent solution.

EXAMPLE 2

An amorphous magnesium halide solution was prepared: anhydrous magnesium chloride (4.75 g) was added into a mixed solvent composed of tetrabutyl titanate (17.6 mL), thiophene (4.0 mL), and anhydrous ethanol (5.6 mL). Hexane (100 mL) was further added therein, and the mixed solution was maintained at 60° C. and stirred for 8 hours so as to obtain a transparent magnesium halide solution.

EXAMPLE 3

According to the present Example, the "anhydrous ethanol (5.6 mL)" in the preparing method of the amorphous magnesium halide solution in Example 1 was replaced by "n-butanol (11.6 mL)," while other conditions were the same as those in Example 1.

EXAMPLE 4

According to the present Example, the "tetrabutyl titanate (17.6 mL)" in the preparing method of the amorphous magnesium halide solution in Example 1 was replaced by "tetraethyl titanate (13 mL)," and "thiophene (4.0 mL)" thereof was replaced by "benzothiophene (8.0 mL)." Other conditions were the same as those in Example 1.

EXAMPLE 5

According to the present Example, the "thiophene (4.0 mL)" in the preparing method of the amorphous magnesium halide solution in Example 1 was replaced by "thiazole (3.6 mL)," while other conditions were the same as those in Example 1.

EXAMPLE 6

Anhydrous magnesium chloride (2.4 g) was added into a mixed solvent composed of tetrabutyl titanate (8.8 mL), thiophene (2.0 mL), anhydrous ethanol (2.2 mL), and toluene (50 mL), and the mixed solution was maintained at 60° C. and stirred so as to form a transparent solution. Toluene (100 mL) was further added therein to obtain a magnesium halide solution.

EXAMPLE 7

An amorphous magnesium halide solution is prepared: anhydrous magnesium chloride (4.75 g) was added into a mixed solvent composed of tetrabutyl titanate (17.6 mL), pyridine (4.0 mL), anhydrous ethanol (4.4 mL), and toluene (200 mL), and the mixed solution was maintained at 60° C. and stirred for 6 hours so as to form a transparent solution.

EXAMPLE 8

An amorphous magnesium halide solution is prepared: anhydrous magnesium chloride (4.75 g) was added into a mixed solvent composed of tetraisooctyl titanate (30.5 mL), pyridine (4.0 mL), and anhydrous ethanol (4.4 mL), and the mixed solution was maintained at 30° C. and stirred so as to obtain a uniform transparent solution. Hexane (50 mL) was further added therein, and the mixed solution was maintained at 30° C. and stirred for 10 hours so as to obtain a transparent magnesium halide solution.

EXAMPLE 9

According to the present Example, the "anhydrous ethanol (4.4 mL)" in the preparing method of the amorphous magnesium halide solution in Example 7 was replaced by "benzyl alcohol (10.4 mL)," while other conditions were the same as those in Example 7.

EXAMPLE 10

According to the present Example, the "pyridine (4.0 mL)" in the preparing method of the amorphous magnesium halide solution in Example 7 was replaced by "pyrrole (3.5 mL)," while other conditions were the same as those in Example 7.

EXAMPLE 11

According to the present Example, the "pyridine (4.0 mL)" in the preparing method of the amorphous magnesium halide solution in Example 7 was replaced by "quinoline (5.9 mL)," while other conditions were the same as those in Example 7.

EXAMPLE 12

According to the present Example, the "tetrabutyl titanate (17.6 mL)" in the preparing method of the amorphous magnesium halide solution in Example 7 was replaced by "tetraethyl titanate (10.9 mL)," and "pyridine (4.0 mL)" thereof was replaced by "pyridine (6.0 mL)." Other conditions were the same as those in Example 7.

EXAMPLE 13

Anhydrous magnesium chloride (2.4 g) was added into a mixed solvent composed of tetrabutyl titanate (8.8 mL), pyridine (3.0 mL), anhydrous ethanol (2.8 mL), and toluene (50 mL), and the mixed solution was maintained at 60° C. and stirred so as to form a transparent solution. Toluene (100 mL) was further added therein to obtain a magnesium halide solution.

EXAMPLE 14

An amorphous magnesium halide solution was prepared: anhydrous magnesium chloride (4.75 g) was added into a mixed solvent composed of tetrabutyl titanate (17.6 mL), epichlorohydrin (4.0 mL), anhydrous ethanol (4.4 mL), and toluene (100 mL), and the mixed solution was maintained at 60° C. and stirred for 6 hours so as to form a transparent solution.

EXAMPLE 15

According to the present Example, the "toluene (100 mL)" in the preparing method of the amorphous magnesium halide solution in Example 14 was replaced by "chlorobenzene (50 mL)," while other conditions were the same as those in Example 14.

EXAMPLE 16

According to the present Example, the "anhydrous ethanol (4.4 mL)" in the preparing method of the amorphous magnesium halide solution in Example 14 was replaced by "isooctanol (15.6 mL)," while other conditions were the same as those in Example 14.

EXAMPLE 17

According to the present Example, the "anhydrous ethanol (4.4 mL)" in the preparing method of the amorphous magnesium halide solution in Example 14 was replaced by "anhydrous ethanol (5.6 mL)," while other conditions were the same as those in Example 14.

EXAMPLE 18

According to the present Example, the "epichlorohydrin (4.0 mL)" in the preparing method of the amorphous magnesium halide solution in Example 14 was replaced by "trityl glycidyl ether (15.8 g)," while other conditions were the same as those in Example 14.

EXAMPLE 19

According to the present Example, the "epichlorohydrin (4.0 mL)" in the preparing method of the amorphous magnesium halide solution in Example 14 was replaced by "1,3-butadiene monoepoxide (3.5 g)," while other conditions were the same as those in Example 14.

EXAMPLE 20

According to the present Example, the "tetrabutyl titanate (17.6 mL)" in the preparing method of the amorphous magnesium halide solution in Example 14 was replaced by "tetraethyl titanate (12.1 mL)," "epichlorohydrin (4.0 mL)" thereof was replaced by "tetrahydrofuran (4.2 mL)," and "60° C." was changed to be "40° C." Other conditions were the same as those in Example 14.

EXAMPLE 21

Anhydrous magnesium chloride (2.4 g) was added into a mixed solvent composed of tetrabutyl titanate (8.8 mL), epichlorohydrin (2.0 mL), anhydrous ethanol (2.2 mL), and toluene (50 mL), and the mixed solution was maintained at 60° C. and stirred so as to form a transparent solution. Toluene (100 mL) was further added therein to obtain a magnesium halide solution.

COMPARATIVE EXAMPLE 1

The operational steps were the same as those in Example 1, except that tetrabutyl titanate was not added therein. A solid-liquid mixture could be obtained. That is, magnesium chloride could not be dissolved completely.

COMPARATIVE EXAMPLE 2

The operational steps were the same as those in Example 7, except that anhydrous ethanol was not added therein. A solid-liquid mixture could be obtained. That is, magnesium chloride could not be dissolved completely.

COMPARATIVE EXAMPLE 3

The operational steps were the same as those in Example 14, except that epichlorohydrin was not added therein. A solid-liquid mixture could be obtained. That is, magnesium chloride could not be dissolved completely.

EXAMPLE 22

A catalyst was prepared. The temperature of the amorphous magnesium halide solution obtained in Example 6 was reduced to −20° C., and titanium tetrachloride (30 mL) was dropwise added therein slowly with a buret. The temperature of the solution was maintained at −20° C., and reaction proceeds for half an hour. The temperature thereof was then raised to 50° C., and reaction proceeded for 4 hours. At last, the temperature of the solution was raised to 90° C., and reaction proceeded for another 3 hours so as to obtain a catalyst suspension. The catalyst suspension stayed for a period of time for precipitation. The catalyst suspension was washed for four times with toluene, and a use amount of toluene was 50 mL for each time. Then, the catalyst suspension was washed for two times with hexane, and a use amount of hexane was 50 mL for each time. The catalyst suspension was blew and dried with high-pure nitrogen at a bath temperature being 65° C. so as to obtain an off-white solid flowable powder, and an average particle size of the powder was 7.53 µm. The elemental analysis results were shown as follows: Ti, 11.25 wt %; and Mg, 18.77 wt %.

The performance of the catalyst was measured. Hexane (1 L), triethylaluminum (1 mmol), and a certain amount of catalyst were added into a stainless steel stirring tank (2 L), and the temperature in the tank was raised to 80° C. Hydrogen (0.18 MPa) was added into the tank once, and the total pressure of the system was maintained at 0.73 MPa with ethylene so that polymerization reaction could proceed. After the reaction proceeded for 2 hours, the supply of ethylene stopped, and the temperature and the pressure thereof were both reduced. Polyethylene powder was weighed, and an activity of the catalyst was calculated. A bulk density (BD) of the polyethylene powder and a melt index ($MI_{2.16}$) thereof under a load of 2.16 Kg were measured. The results were shown in Table 1.

EXAMPLE 23

A catalyst was prepared. The operational step was the same as that in Example 22, except that the amorphous magnesium halide obtained in Example 6 was replaced by the amorphous magnesium halide obtained in Example 13. An off-white solid flowable powder could be obtained, and an average particle size of the powder was 12.18 µm. The elemental analysis results were shown as follows: Ti, 15.33 wt %; and Mg, 12.54 wt %.

The performance of the catalyst could be measured according to the method disclosed in Example 22, and the results were shown in Table 1.

EXAMPLE 24

A catalyst was prepared. The operational steps were the same as those in Example 22, except that the amorphous magnesium halide obtained in Example 6 was replaced by the amorphous magnesium halide obtained in Example 21. An off-white solid flowable powder could be obtained, and an average particle size of the powder was 3.48 µm. The elemental analysis results were shown as follows: Ti, 9.82 wt %; and Mg, 15.42 wt %.

The performance of the catalyst could be measured according to the method disclosed in Example 22, and the results were shown in Table 1.

TABLE 1

|  | Activity (kgPE/g cat) | $MI_{2.16}$ (g/10 min) | BD (g/ml) |
|---|---|---|---|
| Example 22 | 8.3 | 0.16 | 0.30 |
| Example 23 | 12.6 | 4.27 | 0.32 |
| Example 24 | 41.3 | 0.41 | 0.34 |

It can be seen from Table 1 that, the catalyst that is prepared with the magnesium halide solution disclosed herein shows a high catalytic activity in olefin polymerization reaction. Moreover, the bulk density and the melt index of the catalyst that is prepared with the magnesium halide solution disclosed herein can both be regulated according to actual needs so as to obtain a suitable value.

Other magnesium halide solutions prepared in the aforesaid Examples 1 to 21 (i.e., the magnesium halide solutions except those prepared in Examples 6, 13, and 21) were used for preparing the catalyst for olefin polymerization reaction, and the performances thereof were measured accordingly. The catalytic results were similar to those shown in Table 1, and the specific data thereof were not shown herein for conciseness.

It should be noted that, the aforesaid Examples are used for illustrating, rather than restricting, the present disclosure. The present disclosure is described in detail with reference to specific examples. However, the expressions used herein are descriptive and illustrative ones, rather than restricting ones. The present disclosure can be amended within the scope and spirit of the claims. The present disclosure is not limited by specific methods, materials, and examples disclosed herein, but can cover all methods and applications with the same functions.

The invention claimed is:
1. A magnesium halide solution,
consisting of a magnesium halide, an oxygen-containing organic titanium compound, a hydroxyl-containing compound, an organic solvent, and an organic heterocyclic compound;
wherein the organic solvent is selected from the group consisting of a hydrocarbon and a halogenated hydrocarbon.

2. The magnesium halide solution according to claim 1, wherein the organic heterocyclic compound is at least one selected from the group consisting of a sulphur-containing organic heterocyclic compound, a nitrogen-containing organic heterocyclic compound, and an organic epoxy compound.

3. The magnesium halide solution according to claim 2, wherein the sulphur-containing organic heterocyclic compound is at least one selected from the group consisting of a 3 to 8-membered ring sulphur-containing heterocyclic compound and a sulphur-containing heterocyclic compound that is in parallel connection with a benzene ring to form a condensed ring.

4. The magnesium halide solution according to claim 2, wherein the nitrogen-containing organic heterocyclic compound is at least one selected from the group consisting of a 3 to 8-membered ring nitrogen-containing heterocyclic compound and a nitrogen-containing heterocyclic compound that is in parallel connection with a benzene ring to form a condensed ring.

5. The magnesium halide solution according to claim 2, wherein the organic epoxy compound is a 3 to 8-membered epoxy compound.

6. The magnesium halide solution according to claim 2, wherein the organic epoxy compound is at least one selected from the group consisting of ethylene oxide, propylene oxide, butylene oxide, butadiene oxide, butadiene double oxide, epichlorohydrin, methyl glycidyl ether, diglycidyl ether, and tetrahydrofuran.

7. The magnesium halide solution according to claim 1, wherein the magnesium halide solution is formed by dissolving an anhydrous magnesium halide into a mixed solvent that is composed of the oxygen-containing organic titanium compound, the organic heterocyclic compound, the hydroxyl-containing compound, and the organic solvent.

8. The magnesium halide solution according to claim 1, wherein a molar concentration of magnesium halide in the magnesium halide solution ranges from 0.0001 mol/L to 20 mol/L.

9. The magnesium halide solution according to claim 1, wherein measuring by 1 mol of magnesium halide, the magnesium halide solution contains the oxygen-containing organic titanium compound 0.01 mol to 2.0 mol, the organic heterocyclic compound 0.01 mol to 10 mol, and the hydroxyl-containing compound 0.01 mol to 20 mol.

10. The magnesium halide solution according to claim 1, wherein a formula of the magnesium halide is $MgX_2$, X being halogen; and
wherein a formula of the oxygen-containing organic titanium compound is $Ti(OR^3)_nX_{4-n}$, $R^3$ representing $C_1$ to $C_{20}$ saturated or unsaturated linear, branched, or cyclic hydrocarbyl, $0<n\leq 4$, and X being halogen.

11. The magnesium halide solution according to claim 1, wherein a formula of the hydroxyl-containing compound is $HOR^4$, $R^4$ representing $C_1$ to $C_{20}$ saturated or unsaturated linear, branched, or cyclic hydrocarbyl;
wherein the hydrocarbon is $C_3$ to $C_{100}$ saturated or unsaturated linear, branched, or cyclic aliphatic hydrocarbon or aromatic hydrocarbon; and
wherein the halogenated hydrocarbon is $C_3$ to $C_{100}$ saturated or unsaturated linear, branched, or cyclic aliphatic halogenated hydrocarbon or aromatic halogenated hydrocarbon.

12. The magnesium halide solution according to claim 1, wherein the magnesium halide is at least one selected from the group consisting of magnesium chloride, magnesium bromide, and magnesium iodide;
wherein the oxygen-containing organic titanium compound is a titanate compound;
wherein the hydroxyl-containing compound is at least one selected from the group consisting of aliphatic alcohols, aromatic alcohols, and phenols;
wherein the hydrocarbon is at least one selected from the group consisting of benzene, toluene, xylene, n-butane, isobutene, isopentane, n-pentane, n-hexane, cyclohexane, heptanes, octane, and decane; and
wherein the halogenated hydrocarbon is selected from 1,2-dichloroethane and chlorobenzene.

13. A method for preparing the magnesium halide solution according to claim 1, comprising dissolving an anhydrous magnesium halide into a mixed solvent that is composed of an oxygen-containing organic titanium compound, an organic heterocyclic compound, a hydroxyl-containing compound, and an organic solvent until the obtained mixture is uniform.

14. The method according to claim 13, comprising mixing the anhydrous magnesium halide with the oxygen-containing organic titanium compound, the organic heterocyclic compound, and the hydroxyl-containing compound until the obtained mixture is uniform, and then mixing a solution obtained therein with the organic solvent so as to obtain the magnesium halide solution.

15. The method according to claim 13 or 14,
wherein a mixing temperature ranges from 0° C. to 200° C.; and
wherein a mixing time ranges from 10 minutes to 24 hours.

16. The magnesium halide solution according to claim 2, wherein the sulphur-containing organic heterocyclic compound is at least one selected from the group consisting of thiophene, thiazole, isothiazole, benzothiophene, and 4,6-dimethylbenzothiophene.

17. The magnesium halide solution according to claim 2, wherein the nitrogen-containing organic heterocyclic compound is at least one selected from the group consisting of pyrrole, thiazole, imidazole, pyridine, pyrazine, pyrimidine, pyridazine, indole, quinoline, and pteridine.

18. The magnesium halide solution according to claim 2, wherein the organic epoxy compound is a 3-membered epoxy compound as shown in formula (I):

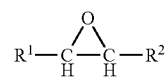

(I)

wherein in formula (I), $R^1$ and $R^2$ respectively represent H, or $C_1$ to $C_{10}$ saturated or unsaturated linear, branched, or cyclic hydrocarbyl or halogenated hydrocarbyl.

19. The magnesium halide solution according to claim 8, wherein a molar concentration of magnesium halide in the magnesium halide solution ranges from 0.001 mol/L to 10 mol/L.

20. The magnesium halide solution according to claim 19, wherein a molar concentration of magnesium halide in the magnesium halide solution ranges from 0.1 mol/L to 10 mol/L.

21. The magnesium halide solution according to claim 9, wherein measuring by 1 mol of magnesium halide, the magnesium halide solution contains the oxygen-containing organic titanium compound 0.1 mol to 1.5 mol, the organic heterocyclic compound 0.1 mol to 6.5 mol, and the hydroxyl-containing compound 0.1 mol to 15 mol.

22. The magnesium halide solution according to claim 11, wherein the hydrocarbon is $C_4$ to $C_{20}$ hydrocarbon; and the halogenated hydrocarbon is $C_4$ to $C_{20}$ halogenated hydrocarbon.

23. The magnesium halide solution according to claim 12, wherein the oxygen-containing organic titanium compound is at least one selected from the group consisting of tetraethyl titanate, tetraisopropyl titanate, tetrabutyl titanate, and tetraisooctyl titanate;
wherein the hydroxyl-containing compound is at least one selected from the group consisting of methanol, ethanol, isopropanol, n-butanol, n-hexanol, isooctanol, benzyl alcohol, and phenylethyl alcohol.

24. The method according to claim 15, wherein the mixing temperature ranges from 20° C. to 150° C.; and the mixing time ranges from 2 hours to 16 hours.

25. An olefin polymerization process, comprising preparing a catalyst by the magnesium halide solution according to claim 1, and then using the obtained catalyst in olefin polymerization reaction;
wherein the preparing a catalyst comprises mixing the magnesium halide solution with a halogen compound to obtain solid particles, washing and drying the solid particles to obtain the catalyst
wherein the using the obtained catalyst in olefin polymerization reaction comprises polymerization of olefin that is performed in the presence of the obtained catalyst.

26. The process according to claim 25, wherein the magnesium halide solution is used for preparing an olefin polymerization reaction catalyst.

* * * * *